Figure 1:
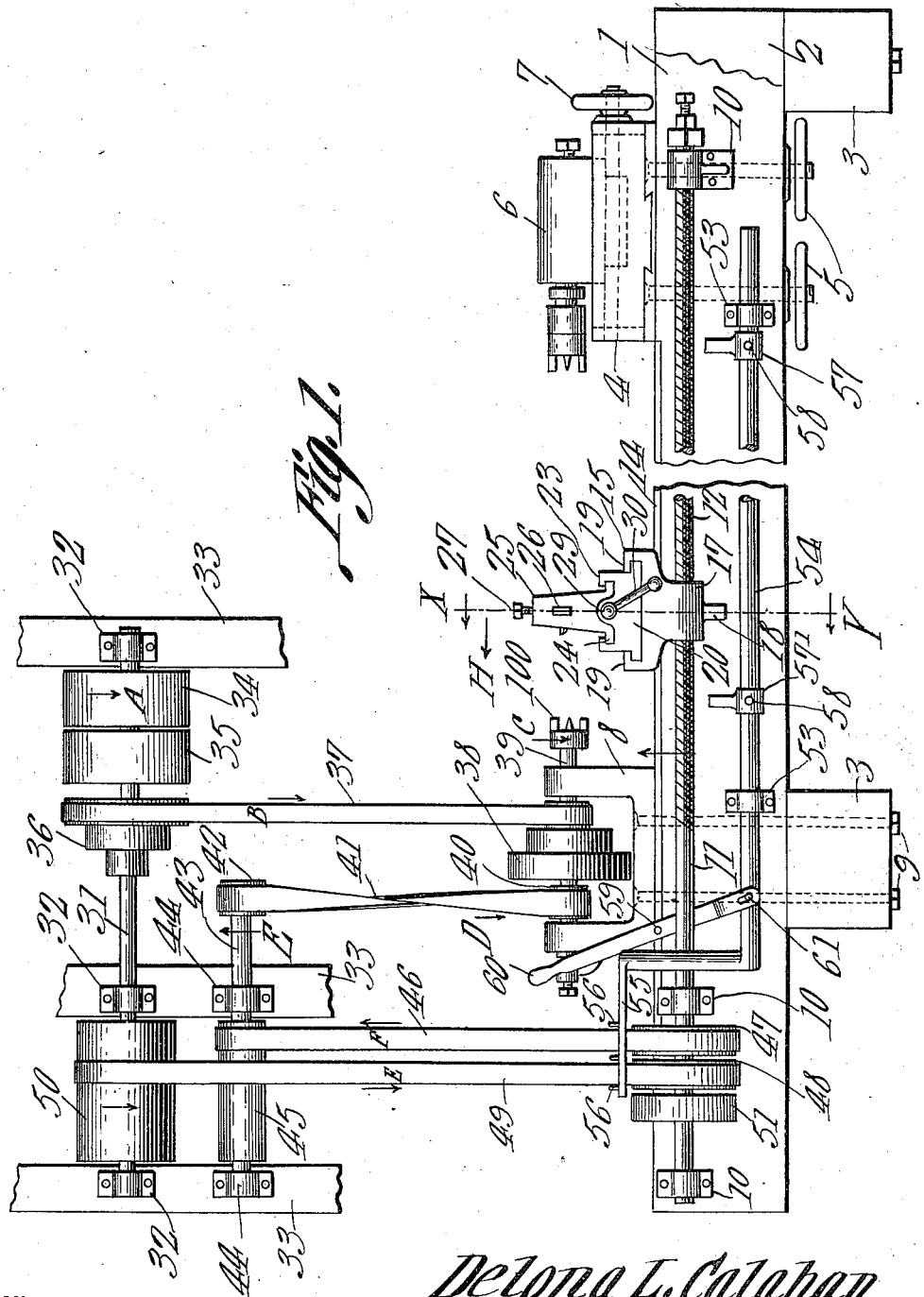

D. L. CALAHAN.
LATHE.
APPLICATION FILED JAN. 10, 1911.

1,045,370.

Patented Nov. 26, 1912.

2 SHEETS—SHEET 1.

Witnesses

Delona L. Calahan
Inventor by C.A. Snow & Co.
Attorneys

D. L. CALAHAN.
LATHE.
APPLICATION FILED JAN. 10, 1911.
1,045,370.
Patented Nov. 26, 1912.
2 SHEETS—SHEET 2.
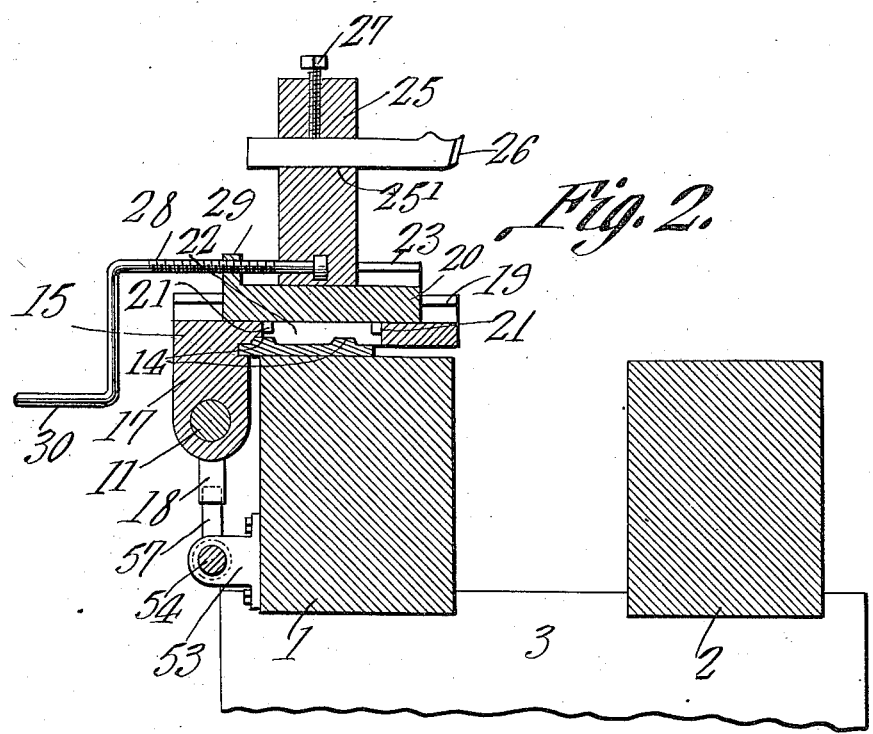
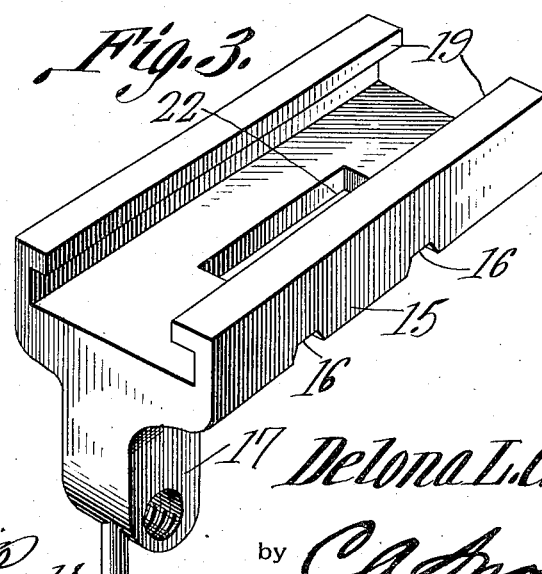
Witnesses
Delona L. Calahan,
Inventor
by
Attorneys

UNITED STATES PATENT OFFICE.

DELONA L. CALAHAN, OF CENTRALIA, WASHINGTON.

LATHE.

1,045,370.  Specification of Letters Patent.  Patented Nov. 26, 1912.

Application filed January 10, 1911. Serial No. 601,796.

*To all whom it may concern:*

Be it known that I, DELONA L. CALAHAN, a citizen of the United States, residing at Centralia, in the county of Lewis and State of Washington, have invented a new and useful Lathe, of which the following is a specification.

It is the object of this invention to provide, in a lathe, a tool-supporting carriage of novel and improved form, adapted to reciprocate longitudinally of the lathe bed, and to provide novel means for securing a reciprocation of the carriage.

Another object of the invention is to provide novel means for reversing the direction of travel of the carriage.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows the invention in side elevation; Fig. 2 is a vertical transverse section on the line X—Y of Fig. 1; Fig. 3 is a perspective of the carriage.

The bed upon which the moving parts of the lathe are mounted, may be variously fashioned. In the present instance, this bed consists of longitudinally extending sills 1 and 2 supported upon cross beams 3, or in any other desired manner. The tail stock 4 of the lathe slides longitudinally of the lathe frame, as is common, the tail stock 4 being adapted to be secured upon the bed frame of the lathe by means of hand wheels 5. A carriage 6 is mounted for reciprocation in the tail stock 4, longitudinally of the lathe bed, this carriage being advanced and retracted by a hand wheel 7. At this point it may be stated that the construction of the tail stock may be varied, and therefore a specific description of this element of the lathe structure, need not be entered into. The head stock 8 is through-bolted to the bed frame, as shown at 9, or is held in place fixedly, in any other suitable manner.

Presupposing that the operator is facing the structure as depicted in Fig. 1, it may be stated that bearings 10 are secured to the forward face of the sill 1. In these bearings 10 is journaled for rotation a lead screw 11, the threaded portion of the screw being denoted by the numeral 12. Slidably mounted upon the shears 14, carried by the sill 1, is a carriage 15, the lower face of the carriage being grooved, as shown at 16, to receive the shears 14. The forward end of the carriage 15 is supplied with a depending arm 17 which, in its turn, may be provided with a downwardly projecting lug 18, having functions which will appear hereinafter. The carriage 15 is equipped with inwardly projecting ribs 19, overhanging and engaging a supplemental block 20. In the lower face of the block 20 there are depending pins 21, seating in an elongated opening 22 in the carriage 15.

The supplemental block 20 is provided with inwardly projecting ribs 23, adapted to overhang a flange 24 formed at the lower end of a tool post 25, the construction being such that the tool post may reciprocate upon the supplemental block, transversely of the bed frame of the lathe. The tool post 25 is equipped with a transverse opening $25^1$, adapted to receive the cutting tool 26, the tool being held in place by a set screw 27, located in the upper end of the tool post 25; however, the means for securing the tool 26 in place in the tool post 25, may be altered within the scope of the art.

In order to secure a reciprocation of the tool post 25, transversely of the bed frame of the lathe, so as to feed the cutting end of the tool 26 toward the work, a screw 28, engaging the tool post 25 at the inner end, is rotatably mounted in a lug 29, upstanding from the supplemental block 20, adjacent the forward end thereof, the screw 28 being equipped with an operating handle 30 of any desired form.

The mechanism for operating the lathe may consist of a line shaft 31, supported for rotation in bearings 32, carried by a supporting structure 33 of any desired form. The line shaft 31 may be driven in a variety of ways; for instance, the line shaft may carry a fixed pulley 34 and an adjacent idle pulley 35, as is common. The line shaft 31 carries for rotation, a cone pulley 36, about which is passed a belt 37, engaging a cone pulley 38 secured to a spindle 39 rotatably mounted in the head stock 8 of the lathe. Secured to the spindle 39 is a pulley 40 about which is passed a crossed belt 41, engaging a pulley 42 secured to a supplemental shaft 43 rotatably mounted in bearings 44 placed upon the supporting structure 33. The supplemental shaft 43 is provided with an elongated pulley 45, about which is passed a belt 46, engaging a pulley 47 fixed upon the screw 11 for rotation therewith. Loosely mounted upon the screw 11, for rotation independently of the rotation of the screw, is an idle pulley 48, carrying a belt 49 engaging an elongated pulley 50 secured to the line shaft 31 for rotation therewith. Secured to the screw 11, beyond the loose pulley 48, is a pulley 51.

Mounted for longitudinal reciprocation in bearings 53 secured to the sill 1 of the lathe bed, is a belt shifter 54, one end 55 of which is carried upwardly above the peripheries of the pulleys 47 and 48. The end 55 of the belt shifter is substantially parallel to the screw 11, and is equipped with spaced elements 56, adapted to engage the belts 46 and 49, to shift the same, as will be described hereinafter.

Mounted upon the belt shifter 54 are spaced stops 57 and 57', held in place upon the belt shifter, adjustably, by set screws 58, or by any other means adapted to a like end.

As will be readily understood, from an inspection of Fig. 1, the stops 57 and $57^1$ may be positioned to engage, successively, with the bearings 53, whereby the sliding movement of the belt shifter, will be limited, thereby positioning the belts properly with respect to the pulleys 47, 48 and 51.

Fulcrumed at 59 to any suitable portion of the lathe bed, is an upright lever of the first order, denoted by the numeral 60, the lower end of the lever being loosely connected by means of a pin and slot union or the like, with the belt shifter 54.

The lathe hereinbefore described, is adapted primarily, although not exclusively, to be employed in turning porch columns and similar structural elements, although, of course, the device may be otherwise employed with equal propriety. When put to the above mentioned end, the porch column which is to be turned down, is engaged between the head stock 8 and the tail stock 4 in the common manner. The operation of the device, in such instance, is as follows, and at this point it may profitably be stated that in describing the motions of the several belts, those segments of the belts which are disposed toward the operator will be considered.

Presupposing that the parts are positioned as shown in Fig. 1, when the line shaft 31 is rotated in the direction of the arrow A, the belt 37 will be driven in the direction of the arrow B, causing the spindle 39 to rotate in the direction of the arrow C, thus turning the work against the tool 26. The cross belt 41, moving in its lower forward segment in the direction of the arrow D will rotate the supplemental shaft 43 in the direction of the arrow E, causing the belt 46 to move in the direction of the arrow F, this movement of the belt 46 causing the screw 11 to rotate in the direction of the arrow G, the carriage 15 and the tool post 25 moving in the direction of the arrow H.

After the carriage 15 has moved sufficiently in the direction of the arrow H, the lug 18 will engage the stop $57^1$, sliding the belt shifter 54 in the direction of the arrow H, the elements 56 sliding the belt 46 from the fixed pulley 47 to the loose pulley 48, the belt 49 passing from the loose pulley 48 upon the fixed pulley 51. The belt 46 being mounted upon the loose pulley 48 there will be no drive imparted to the screw 11 through the belts 46, 41 and 37, the belt 37, however, continuing to rotate the spindle 39 in the direction of the arrow C.

With the parts positioned as last above described, the line shaft 31, continuing its rotation in the direction of the arrow A, will drive the belt 49 in the direction of the arrow L. The belt 49, being now engaged with the fixed pulley 51, will drive the screw 11 in a direction opposite to the arrow G. This reversal in the direction of the rotation of the screw 11, will cause the carriage 15 to move in a direction opposite to that indicated by the arrow H, until the lug 18 engages the stop $57^1$, whereupon the belt shifter 54 will be slid in a direction opposite to that indicated by the arrow H, and the belts 39 and 46 will again be positioned as shown in Fig. 1, the carriage 15, thereupon, beginning anew its travel toward the head stock 8.

From the foregoing it will be seen that automatically, the carriage 15 will reciprocate between the head stock 6 and the tail stock 4, the tool 26 traveling longitudinally along the work. Obviously, by rotating the screw 28, the tool post 25 may be advanced transversely of the bed frame of the lathe, thus feeding the tool 26 against the work.

The direction of movement of the carriage 15 may be reversed at any time, by shifting the lever 60 manually, thereby causing a reciprocation of the member 54, and effecting a transverse movement of the belts 46 and 49 upon the pulleys 47, 48 and 51.

Obviously, the chuck 100 which is carried by the shaft or spindle 39, constitutes a work-holder coöperating with the tool 26 which is retained in the tool post 25, for reciprocation with the carriage 15.

Having thus described the invention what is claimed is:—

In driving mechanism for a turning lathe, a bed; a lead screw supported by the bed; a tool carriage operable by the lead screw; a chuck-spindle supported by the bed; a supporting structure; a line shaft journaled in the supporting structure; a supplemental shaft journaled in the supporting structure; a crossed belt connecting the supplemental shaft with the chuck spindle; a direct belt connecting the chuck spindle with the line shaft with the provision for change of speed; a pair of direct belts, one of which is rotatable with and slidable upon the line shaft, the other of which is rotatable with and slidable upon the supplemental shaft; fixed and loose pulleys upon the lead screw, with which pulleys the pair of direct belts are adapted to engage; and a belt shifter slidable upon the bed and operable by the carriage to shift the pair of direct belts upon the pulleys.

In testimony that I claim the foregoing as my own, I have hereto affixed my signature in the presence of two witnesses.

DELONA L. CALAHAN.

Witnesses:
 CLYDE SEALES,
 EMIL LENHARDT.

Copies of this patent may be obtained for five cents each, by addressing the "Commissioner of Patents, Washington, D. C."